Patented Jan. 29, 1924.

1,482,343

UNITED STATES PATENT OFFICE.

MAX BOCKMÜHL, OF HOCHST-ON-THE-MAIN, AND ADOLF SCHWARZ, OF FRANKFORT-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

PROCESS OF MAKING α-ALKYLATED ACIDS AND DERIVATIVES THEREOF.

No Drawing.  Application filed August 14, 1922. Serial No. 581,887.

*To all whom it may concern:*

Be it known that we, MAX BOCKMÜHL and ADOLF SCHWARZ, citizens of Germany, residing—(1) at Hochst-on-the-Main, (2) at Frankfort-on-the-Main, Germany, have invented certain new and useful Improvements in a Process of Making α-Alkylated Acids and Derivatives Thereof, of which the following is a specification.

We have found that by the action of heavy metals upon molecular mixtures of the halogen fatty acid compounds of the formula

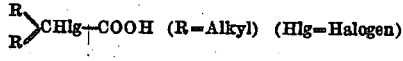

and their derivatives such as esters and nitriles, which may be represented by the general formula

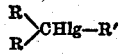

wherein R may be an alkyl residue and R' a carboxyl-, carbonic acid-amide, or a cyan-residue and Hlg stands for halogen, with halogen alkyls, halogen-free acids and their compounds can be obtained which compounds represent valuable soporifics when transformed into their amides. The process is very surprising in so far as for instance by replacing the heavy metals by alkali metals, quite a different reaction takes place (see e. g. Arch. d. Ph. 246,182), whereby, owing to the intramolecular separation of hydrohalogenic acid, unsaturated bodies are partly formed whereas the heavy metals used in this process have exclusively a condensing effect. According to the new process it is possible to produce substances such as diethylallylacetamide, which has for instance a very great hypnotic action and could not be produced hitherto in any other way (comp. C. B. 09, I, 912). Examples of the compounds obtainable are those which may be represented by the general formula

wherein R means alkyl and R' allyl.

The following examples illustrate our invention; the parts being by weight:

1. 71.5 parts of diethylbromacetonitrile, 49.2 parts of allylbromide, 225 parts of toluene and 75 parts of copper powder are boiled for 8 hours while stirring in a reflux condenser. After filtration the toluene is distilled off and the residue submitted to distillation under diminished pressure, whereupon the diethylallylacetonitrile boiling at 83–84° C. at 10 m/m. pressure is obtained. 18 parts of diethylallylacetonitrile are boiled with 45 parts of powdered caustic alkali and 100 parts of alcohol for 9 hours in a reflux condenser. After distilling off the alcohol, the product is washed until it gives a neutral reaction and distilled. The diethylallylacetamide distils at 155° C. under 10 m/m. pressure as a solidifying oil. The melting point of the substance when crystallized from petroleum ether is 80° C.

2. 97 parts of α-bromdiethylacetamide, 55 parts of ethyl bromide and 70 parts of copper powder are treated in a solution of toluene as described in Example 1. The triethylacetamide obtained after the filtration and distillation of the toluene melts at 108° C.

Having now described our invention what we claim is:

1. The process of producing α-alkylated acids and derivatives thereof which consists in causing heavy metals to react upon mixtures of halogen compounds of the general formula

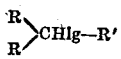

wherein R may be an alkyl residue and R' a carboxyl-, carbonic acid-amide-, or a cyan-residue, and Hlg stands for halogen—with alkyl halides and transforming the carbonic acids, esters and nitriles thus obtained into the amides.

2. The process of producing α-alkylated acids and derivatives thereof, which consists in causing heavy metals to react upon mixtures of the halogen compounds of the general formula

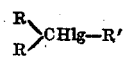

wherein R may be an alkyl residue and R' a carboxyl-, carbonic acid-amide-, or a cyan-residue, and Hlg stands for halogen—with allyl halides and transforming the products thus obtained into amides.

3. As new products the carbonic acid-amides of the general formula

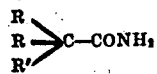

wherein R means alkyl and R' allyl.

4. As a new product the diethyl-allyl-acetamide of the general formula

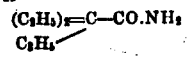

In testimony whereof, we affix our signatures.

Dr. MAX BOCKMÜHL.
Dr. ADOLF SCHWARZ.

Witnesses:
 BASIL E. SAVARD,
 T. H. ANDERSON.